Patented Apr. 22, 1930

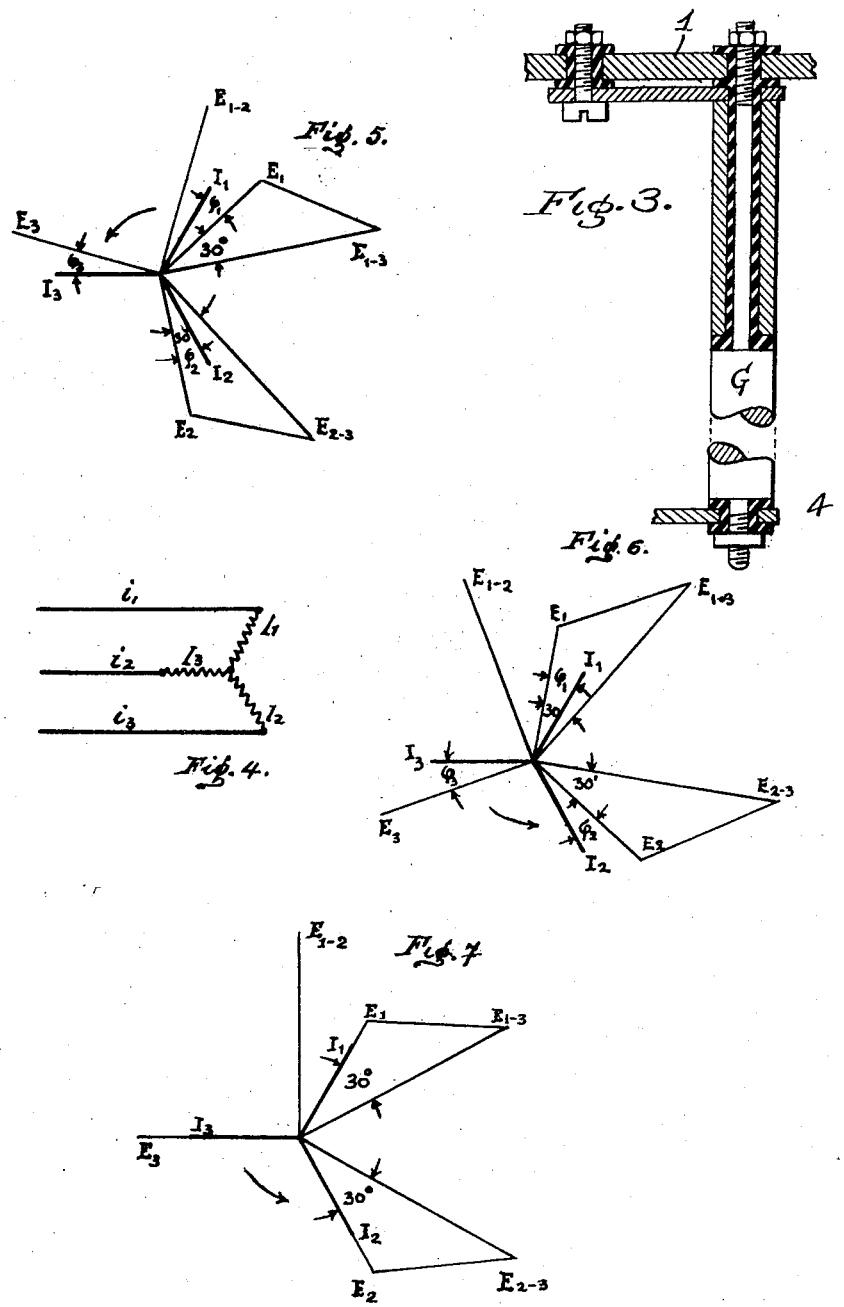

1,755,491

UNITED STATES PATENT OFFICE

VINCENZO FAUSTO SPIGAI, OF LA SPEZIA, ITALY

AUTOMATIC REGULATOR FOR POWER-FACTOR IMPROVING APPARATUS

Application filed July 22, 1924, Serial No. 727,584, and in Italy July 30, 1923.

The present invention has for its object an automatic regulator for apparatus intended to improve the power factor of electric distribution systems. The devices intended to relieve the generators from the production of the magnetization component requisite for asynchronous motors and to exclude this component from the long transmission lines and from the transforming stations may be divided into two broad classes:

(a) The devices acting on the current before it enters the motor stators;

(b) The devices acting on the current after the motor stators.

The devices of the former class may provide the magnetization component for all asynchronous motors arranged after the point where the device is fitted on the line, no matter what the number of the motors may be. The devices of the latter class, at least as a rule, serve for one motor only, however they may increase materially the motor power output. The first class comprises: condensers, synchronous and self-synchronizing motors; the second class comprises the Scherbius exciting machine and the Kapp vibrator. In the case of the first class of devices it should also be considered whether the synchronous motor will be used only as a means for improving the power factor, or also for performing some other duty.

The regulator according to the present invention may be used in order to regulate the excitation of a synchronous motor to maintain the power factor constant, whatever may be the variations in the circuit by which the motor is fed and in the load carried by the motor.

The regulator according to the invention is illustrated in the accompanying drawings, wherein:

Fig. 3 is a detail figure.

Figs. 4 and 5 are two diagrams illustrating the principle of the measurement of the power and power factor in a triphase system.

Figs. 6 and 7 are two diagrams illustrating the working of the regulator.

Figure 1:
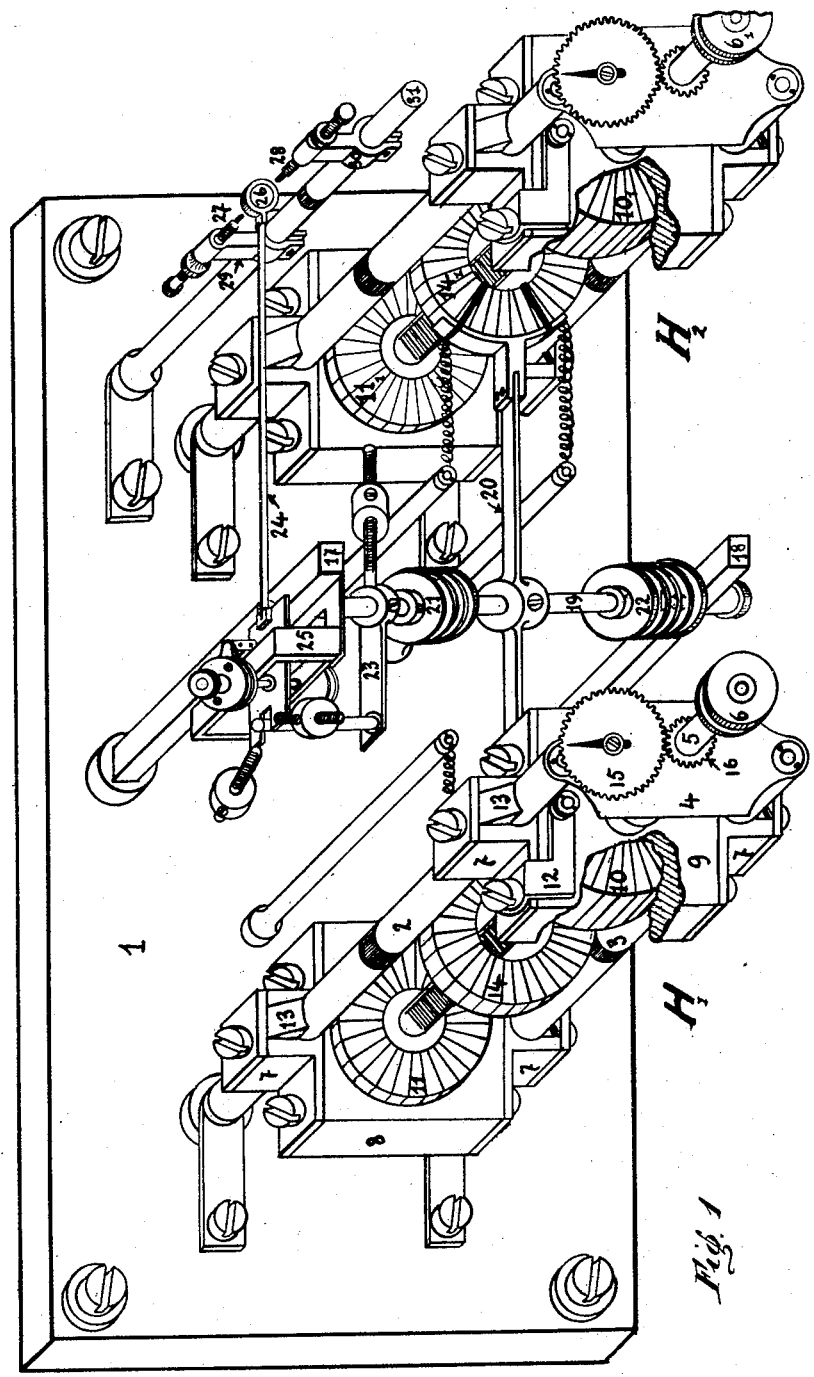
Fig. 1 shows the regulator in perspective view.

The regulator comprises two electrodynamometers $H_1$—$H_2$ identical in construction and capacity. The essential parts making up the two dynamometers are:

(a) Two current circuits,
(b) Two tension circuits,
(c) A controlling relay.

1. Current circuits

As the two current circuits, like the electrodynamometers themselves are identical in construction and capacity, what we are going to say about the current circuit of $H_1$ applies also to the current circuit of $H_2$. As usual, on the metal base 1, which carries all the other parts, are secured the rear ends of the cylindrical guides 2 and 3, the front ends of which are connected together by the plate 4. In the base 1 and plate 4 two holes are formed, in which is rotatably carried the spindle 5 having at its forward end the knurled button 6. The spindle portion comprised between the base 1 and the plate 4 is screwthreaded, the thread being right-handed on one half and lefthanded on the other half of the said length. The metal supports 7, having a sliding fit on the guides 2 and 3, are secured to the top face of the boxes 8 and 9 made of non-conducting material and containing the current coils 10 and 11. Secured in the center of the metal boxes 8 and 9 are two cylindrical internally tapped bushes forming two nuts engaged respectively by the right-hand, and the left-hand thread of spindle 5. The ends of the winding of the current coils 10 and 11 are connected through copper strips 12 to the supports 7; while the coils are travelling along the spindle 5, the supports 7 are kept in contact with the guides 2 and 3 by the plate springs 13 secured to the said supports. When by means of the knurled button 6 the spindle 5 is revolved, the current coils 10 and 11 travel in opposite directions, their inner faces moving away from or nearer to each other, the pressure coil 14 being movably arranged between the two; the distance between the inner faces of 10 and 11 is indicated at any moment by the pointer fixed to the spindle of the gear wheel 15, this gear being actuated by the pinion 16 keyed on the spindle 5. The guides 2 and 3, the detail of which is shown in Fig. 3, consist each of two equal lengths of metal rod, the two halves in each guide being insulated from one another, from the base 1 and from the plate 4.

2. Tension circuits

Into the metal supports 17 and 18 secured to the base 1 are screwed two adjustable screws fitted with agate, on which rest the hardened steel ends of the rotatable spindle 19 of the movable equipment. The tension coils 14 and $14_1$ are carried by the metal rod 20 having midway of its length an enlargement secured to the spindle 19 by means of a set-screw. The springs 21 and 22, threaded on the spindle 19 and acting in opposite direction to each other, serve to position the movable equipment to zero, and the small lever arm 23, likewise carried by the spindle 19, serves to transmit the movements of the movable equipment to the swinging rod 24 of the relay.

3. Controlling relay

To the upper support 17 is fixed the small metal frame 25, in the top and bottom of which are provided two adjustable screws fitted with agate and carrying the rotatable spindle for the swinging rod 24. The frame 25 has two movable arms for attachment of two springs tending to bring the rod 24 back to zero. On the swinging rod 24 are provided: a pin whose steel pointed ends rest on agate, a platinum plate 26 adapted to make contact with one or the other of the platinum cylinders carried by the screws 27 and 28 fitted in the brackets 29 and 30 provided on the rod 31; this rod being identical in construction to the guide rods 2 and 3 (Fig. 3).

Figure 2:
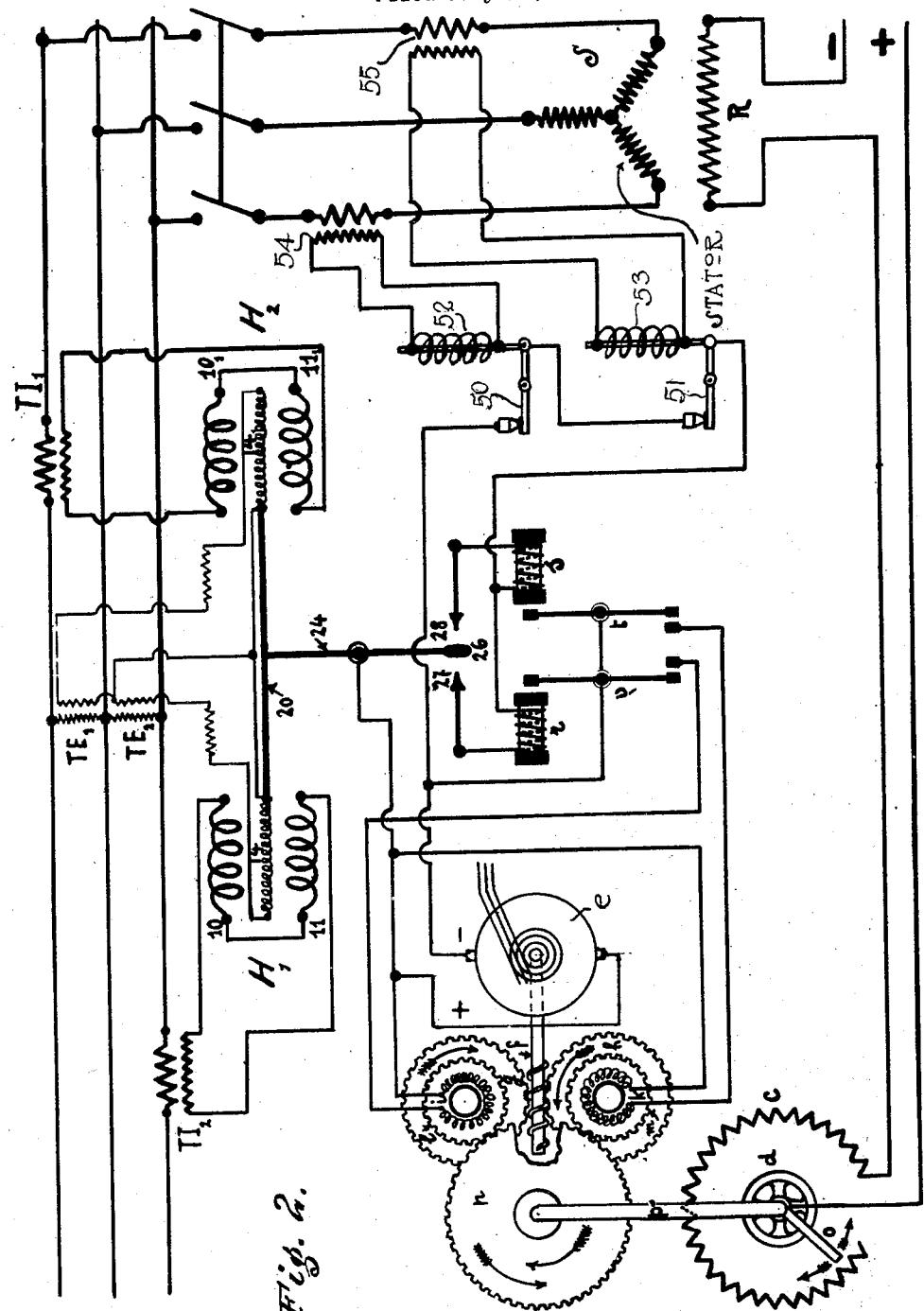
Fig. 2 shows the apparatus along with the regulation circuits.

The diagram of Fig. 2 shows the regulator as fitted on the main bus-bars of a distributing central station provided with a thermal reserve plant and fed from a generating central station, the distributing station being equipped with a synchronous motor for the purpose of increasing the power factor.

In the direct current circuit R a graduated rheostat —c— is inserted, the rheostat being operated by hand through the handwheel —d— or by the small rotary converter —e— which in its turn is automatically controlled by the regulator. The extension of the converter spindle is provided with a worm —f— meshing with the helical wheels —g— and —h—. The converter —e— runs at constant speed and always in the same direction and drives the helical wheels —g— and —h—, which run loose as long as no current circulates through the coils —i— and —k— of the electro-magnetic clutches; when either of the said coils is traversed by the current, the helical wheels alternatively drive the gear wheels —l— and —m—. The revolving direction of —l— and —m— indicated by the arrows is transmitted to the gear wheel —n— carried by one end of the spindle —p—, while the other end of —p— carries the movable contact —o— and the hand-wheel —d— of the rheostat. The converter —e—, besides supplying the necessary power for operating the movable contact —o— of the rheostat, converts the current from alternating into direct current, as required for coils of the electromagnetic clutches and of the relays.

In the direct current circuit of the converter e, which supplies the operating currents for the relay, are arranged the two no-load circuit breakers 50 and 51, controlled respectively by solenoids 52 and 53 energized from the transformers 54 and 55 in the supply leads of the synchronous motor so that when this motor is not running this direct current circuit is opened. It will also be opened upon failure of any one phase of the motor.

Referring to Figs. 4 and 5, the measurement of the power and power factor of a triphase system is effected, as well known, in the following manner:

The instantaneous power $Pi$ of a starconnected triphase system is given (Fig. 4) by $Pi = i_1 e_1 + i_2 e_2 + i_3 e_3$, wherein $i_1$, $i_2$, $i_3$ are the line currents and $e_1$, $e_2$, $e_3$ the star voltages of the system. As $i_3 = i_1 + i_2$, the equation becomes: $Pi = i_1(e_1 - e_3) + i_2(e_2 - e_3)$. The average power is given by:

$$Pm = \frac{1}{T} \int_0^T i_1(e_1 - e_3)\, dt + \frac{1}{T} \int_0^T i_2(e_2 - e_3)\, dt$$

and is measured by the readings of two wattmeters. If we indicate by $W_1$, $W_2$ the two wattmeters and by $a_1$, $a_2$ the respective readings, we have: $a_1 + a_2 = Pm$. The value of the power factor is given by $$\cos \varphi = 2 \frac{a_1 + a_2}{\sqrt{a^2_2 - a_1 a_2 + a^2_2}}.$$

If the circuit in question is a high tension circuit, current and voltage transformers $TI_1$, $TI_2$ and $TE_1$, $TE_2$ (Fig. 2) should be used.

In Fig. 5 the currents and voltages at play are represented by vectors, $E_1$ $E_2$ $E_3$, being the star voltage and $I_1$, $I_2$, $I_3$ the currents in each of the three wires. The current coil of $W_1$ will be traversed by a current proportional to $I_1$ and in phase with the latter, while the corresponding tension coil will be traversed by a voltage proportional to $E_{1-3}$ and in phase with the latter. The power indicated by $W_1$ is directly proportional to $I_1 E_{1-3} \cos \widehat{IE_{1-3}} = I_2 E_{1-3} \cos (30° + \varphi)$. At the same moment the power indicated by $W_2$ will be: $I_2 E_{2-3} \cos (\widehat{I_2 E_{2-3}}) = I_2 E_{2-3} \cos (30° - \varphi_2)$.

If the system under consideration is balanced, we may write $E_1=E_2=E_3=E$, $I_1=I_2=I_3=I$, $\varphi_1=\varphi_2=\varphi_3=\varphi$, and accordingly $E_1-3=E_2-3=E_{1-2}=E\sqrt{3}$. The power indicated by $W_1$ is then proportional to:

$$\sqrt{3}\,IE[\cos(30°-\varphi)+\cos(30°+\varphi)]=3IE\cos\varphi.$$

If we replace the expressions "wattmeters", "indications" and "power" by the expressions "electrodynamometers", "component motive couples" and "resulting motive couple", we have:

1. Component motive couple of $H_1$:
$$C_1=IE\sqrt{3}\cos(30°-\varphi) \quad (I)$$

2. Component motive couple of $H_2$:
$$C_2=IE\sqrt{3}\cos(30°+\varphi) \quad (II)$$

3. Resulting or total motive couple:
$$C_3=IE\sqrt{3}\,[\cos(30°-\varphi)+\cos(30°+\varphi)],$$
that is to say
$$C_3=3IE\cos\varphi \quad (III)$$

which tends to produce the deviation of the movable equipment of the regulator.

The regulation effected by the regulator is based on the variations of the angle $\varphi$ as resulting at the main bus-bars of the distributing central station due to frequence and pressure variations occurring at the generating central station, to ohmic and inductive drop in the line, and to variations in the working conditions of the users' plants lying after the bus-bars of the distributing central station. In order to maintain a constant value of the angle $\varphi$ at the bus-bars of the distributing station, it would be necessary that for each of the said variations a corresponding regulation should be made in the exciting current of the revolving inductor field R of the synchronous motor. It suffices to consider the quickness and simultaneousness with which the variations of the angle $\varphi$ may take place to realize the utter impossibility for an industrial plant to adjust the value of the excitation by the mere operation of the rheostat $c$ by hand in spite of the attendant's greatest experience and good will.

For the purpose in view it will suffice to demonstrate that the operation of the rheostat and the adjustment of the excitation value towards maintaining a steady angle $\varphi$ at the bus-bars are obtained readily and with certainty by means of the automatic regulation carried out by the regulator. It is well known that, by suitably adjusting the excitation current of the revolving inductor field in the running motor, the load on the bus-bars at the generating station can be considered in respect to the impressed voltage under three different conditions, viz.:

1. As an ohmic load, when the currents at the bus-bars are in phase relatively to the impressed voltage; the angle $\varphi$ is 0° and the vectors $I_1\,I_2\,I_3$, representing the currents at the bars, coincide with the vectors $E_1\,E_2\,E_3$ representing the impressed voltage (Fig. 7).

2. As an inductive load, when the currents lag behind the voltages, the angle $\varphi$ increases and the vectors $I_1\,I_2\,I_3$ lag behind the vectors $E_1\,E_2\,E_3$ (Fig. 6).

3. As a capacity load, when the currents lead relatively to the voltages the angle $\varphi$ increasing and the vectors $I_1\,I_2\,I_3$ lead relatively to the vectors $E_1\,E_2\,E_3$ (Fig. 5).

Let us assume that in connection with the conditions 2 and 3 the angle be for instance $\varphi=26°$ lag, and $\varphi=26°$ lead respectively. If in the formulæ I and II we substitute the values: $\varphi=0°$, $\varphi=26°$ lag, $\varphi=26°$ lead, we obtain:

For condition 1:
$$C_1=IE\sqrt{3}\cos(30°-0°)=IE\sqrt{3}\times 0.86603$$
$$C_2=IE\sqrt{3}\cos(30+0°)=IE\sqrt{3}\times 0.86603$$

The III formula becomes:
$$IE\sqrt{3}\,(0.86603+0.86603).$$

For condition 2:
$$C_1=IE\sqrt{3}\cos(30°-26°)=$$
$$IE\sqrt{3}\cos(4°)=IE\sqrt{3}\times 0.99750$$
$$C_2=IE\sqrt{3}\cos(30°\,26°)=IE\sqrt{3}\times 0.64279$$

The III formula becomes:
$$C_2(Cr)=IE\sqrt{3}\,(0.99750+0.64279).$$

If we reverse the connections in one of the two pairs of current coils, for instance in the coils 10 and 11 of $H_1$, we have:

For condition 1:
$$C_1=IE\sqrt{3}\,(-0.86603)$$
$$C_2=IE\sqrt{3}\,(+0.86603)$$
$$Cr=IE\sqrt{3}\,(-0.86603+0.86603)=0.$$

For condition 2:
$$C_1=IE\sqrt{3}\,(-0.99750)$$
$$C_2=IE\sqrt{3}\,(0.64279)$$
$$Cr=IE\sqrt{3}\,(-0.35471)$$

And for condition 3:
$$C_1=IE\sqrt{3}\,(0.64279)$$
$$C_2=IE\sqrt{3}\,(0.99750)$$
$$Cr=IE\sqrt{3}\,(0.35471).$$

When for condition 1 (angle $\varphi=0°$) the component couples $C_1$ and $C_2$ are equal in value and opposite in direction, the total couple $Cr$ is zero and the movable equipment, being subjected only to the action of the antagonistic springs, remains at rest (pointer at zero).

When, on the contrary, with condition 2 the angle $\varphi=26°$ lag, the component couple $C_1$ increases and $C_2$ decreases in value, the total couples is $Cr=IE\sqrt{3}\,(-0.35271)$, the movable equipment revolves in the sense of bringing the platinum plate 26 (Fig. 2) into contact with the screw 27.

When finally condition 3, obtains, the angle $\varphi$ being 26° lead, the component $C_1$ will decrease and the component $C_2$ will increase in value and the total couple is accordingly proportional to $Cr = IE\sqrt{3}(0.35471)$. The movable equipment then turns in such a direction as to bring the platinum plate 26 into contact with the screw 28.

Let us now examine how the regulation practically is effected when condition 1 obtains.

The attendant operates the hand-wheel —c— of the rheostat —d— by hand (Fig. 2) and therewith adjusts the value of the excitation until he obtains $\cos \varphi = 1$ at the bus-bars, this angle being read on the scale which we assume to be fitted up at the bus-bars. If after the said operation we observe the regulator, we shall see that the movable equipment is at rest position and maintains the plate 26 insulated from both screws 27 and 28. If the condition 2 sets in, the movable equipment will be displaced and the direction of the displacement will be to the effect of bringing the plate 26 into contact with the screw 27. The movable arm of the rheostat —c—, as set out above, is shifted to the effect of lowering the resistance of the inductor field R and thus raising the value of the excitation until the movable equipment is restored to its rest position.

If, instead, condition 3 sets in, the movable equipment turns in the sense of bringing the plate 26 into contact with the screw 28. The rheostat arm —o— is then shifted to the effect of increasing the resistance inserted in the circuit of the inductor field R and thus lowering the excitation until the movable equipment returns to its rest position.

A regulator whose automatic regulation should be confined to maintain $\cos \varphi = 1$ would find no practical application because, as well known, the total power factor of the very best plants, under the most favorable conditions, hardly reaches 0.8.

With reference to condition 2, let us suppose that the automatic regulation of the rheostat —c— has been temporarily eliminated by shutting off the current from the relay coils —r— and —s— or from the coils —i— and —k— of the electromagnetic clutches. By adjusting the excitation current through the handwheel —c— let now the power factor at the bus-bars be reduced from $\cos \varphi = 1$ to $\cos \varphi = 0.9$ lag; the angle corresponding to $\cos \varphi = 0.9$ is 26°. By substituting this value in the Formulæ I and II we have: $C_1 = IE\sqrt{3}(-0.98750)$, $C_2 = IE\sqrt{3}(0.64279)$, and the Formula III becomes, $C_1 = IE\sqrt{3}(0.35771)$. The movable equipment will be shifted from the rest position and maintain the plate 26 in contact with the screw 27.

If no cause intervenes to modify the frequency and pressure at the bus-bars in the distributing station nor the load, the movable equipment will steadily remain in the new position since the automatic regulation through the rheostat —c— is disconnected.

If it be wished to restore the movable equipment to its rest position and to maintain $\varphi = 26°$ at the bus-bars the component couples $C_1$ and $C_2$ should be rendered equal in value and opposite in direction, that is to say the total couple $C_2$ should be nullified.

It now remains to consider how this object can be realized without altering the electric characteristics of the two electrodynamometers and without making any alterations in the excitation, frequency, tension and load.

It has already been stated that the component couples $C_1$ and $C_2$ are proportional to the main currents circulating through the current coils and to the shunted currents circulating through the pressure coils. It has also been demonstrated that when the current tension and angles are the same in the different phases and the main currents are in phase with the shunted currents, the couples $C_1$ and $C_2$ are equal in value and opposite in direction and the total couple is $Cr = 0$. We now must add that all these conditions are required but not sufficient to enable to say that the two couples $C_1$ and $C_2$ are equal and that the total couple is nought.

In fact if we gradually move the current coils 10 and 11 up to an infinite distance apart from the pressure coil 14 of $H_1$, the component couple $C_1$ will gradually sink in value till it is nullified.

The regulation effected by the regulator throughout the series of the successive values of angle $\varphi$ comprised between $+60°$ and $-60°$ is based on the relative distance of current coils from the pressure coils in the two electrodynamometers. Practically the operation for varying the said distance is effected by means of the knurled buttons 6 and $6_1$ (Fig. 1); by turning the knurled button 6 clockwise the current coils 10 and 11 are moved away from the pressure coil 14 and the movable equipment is restored into its rest position.

When closing the circuit of the relay coils —r— and —s— or that of the coils —i— and —k— of the electromagnetic clutches, the movable contact —o— of the rheostat —c— remains at rest in the position in which it finds itself. If the button is turned further on and the current coils are thus removed farther away from the pressure coil, the movable equipment turns and operates the movable contact —o— of the rheostat —c— to the effect of further lowering the value of the excitation by increasing the angle $\varphi$ at the bus-bars.

An anticlockwise operation of the knurled button moves the current coils nearer to the pressure coil and causes the movable equipment to be displaced in opposite direction to the foregoing one, therewith turning the movable contact —o— to the effect of increasing the excitation and lowering the value of the angle $\varphi$ so as to restore $\cos \varphi = 1$.

The regulation for condition 3 is obtained by turning the knurled button $6_1$, thereby moving the current coils $10_1$ and $11_1$ away from or nearer to the pressure coil $14_1$ in $H_2$ and thus varying the intensity of the couple $Cr$.

Having now particularly described and ascertained the nature of my said invention and in what manner the same is to be performed, I declare that what I claim is:—

1. An apparatus for the regulation of the power factor in a polyphase net, comprising a pair of contacts, a movable contact means for making contact with one or the other of said first mentioned contacts, means for actuating said movable contact, comprising an electrodynamometer, said electrodynamometer comprising a pair of movable current coils, and a movable voltage coil, means for controlling the torque on said voltage coil, means for transmitting the movement of said voltage coil to said movable contact means.

2. In an apparatus for the regulation of a power factor in a net, comprising a pair of contacts, movable contact means for making contact with one or the other of said first mentioned contacts, means for actuating said movable contact means, comprising a pair of electrodynamometers, each of said electrodynamometers comprising a pair of current coils and a movable voltage coil, means for varying the position of the current coils of each dynamometer with respect to the voltage coil of said each electrodynamometer, and means for transmitting the motion of said voltage coils to said movable contact means.

3. An apparatus for the regulation of the power factor in a polyphase net system, comprising a pair of contacts, movable contact means for making contact with one or the other of said first mentioned contacts, means for actuating said movable contact, comprising an electrodynamometer having a pair of movable current coils, and a movable voltage coil, means for varying the position of said current coils relative to said voltage coil for controlling the torque of said voltage coil, and means for transmitting the movement of the voltage coil to the movable contact means.

VINCENZO FAUSTO SPIGAI.